United States Patent
Greenland et al.

[15] 3,655,134
[45] Apr. 11, 1972

[54] JET ENGINES FOR AIRCRAFT
[72] Inventors: Leonard Sidney Greenland; Charles Philip Smith; David Marshall, all of Wolverhampton, England
[73] Assignee: H. M. Hobson Limited, London, England
[22] Filed: Nov. 23, 1970
[21] Appl. No.: 91,859

[52] U.S. Cl. ........................................239/265.37, 60/230
[51] Int. Cl. ........................................................B64c 15/06
[58] Field of Search ..................239/265.11, 265.19, 265.33, 239/265.37; 60/228, 230

[56] References Cited

UNITED STATES PATENTS 3,419,218 12/1968 Campbell et al.................239/265.37
3,532,275 10/1970 Hom et al. ......................239/265.37 X
3,550,855 12/1970 Feld et al. ..............................60/230 X

*Primary Examiner*—M. Henson Wood, Jr.
*Assistant Examiner*—Michael Y. Mar
*Attorney*—E. T. Le Gates

[57] ABSTRACT

A thrust reversal system for an aircraft jet engine comprising a pair of thrust reverser buckets movable between a stowed and a deployed position, an air motor operable under pilot's control for imparting movement to the buckets and mechanism for automatically decelerating the air motor as the buckets approach both the stowed and the deployed positions.

12 Claims, 8 Drawing Figures

JET ENGINES FOR AIRCRAFT

This invention provides a thrust control system for an aircraft jet engine, comprising a pair of thrust reverser buckets movable between a stowed and a deployed position, an air motor operable under pilot's control for imparting movement to the buckets and mechanism for automatically decelerating the air motor as the buckets approach both the stowed and the deployed positions.

In one preferred embodiment of the invention a snubber valve and a brake are provided for causing deceleration of the motor as the buckets approach the fully closed deployed position and the stowed position. Alternatively the system may include position feedback to an electrical control valve of the air motor or to the snubber valve. In such cases the snubber valve and/or the brake may be omitted.

Figure 1:
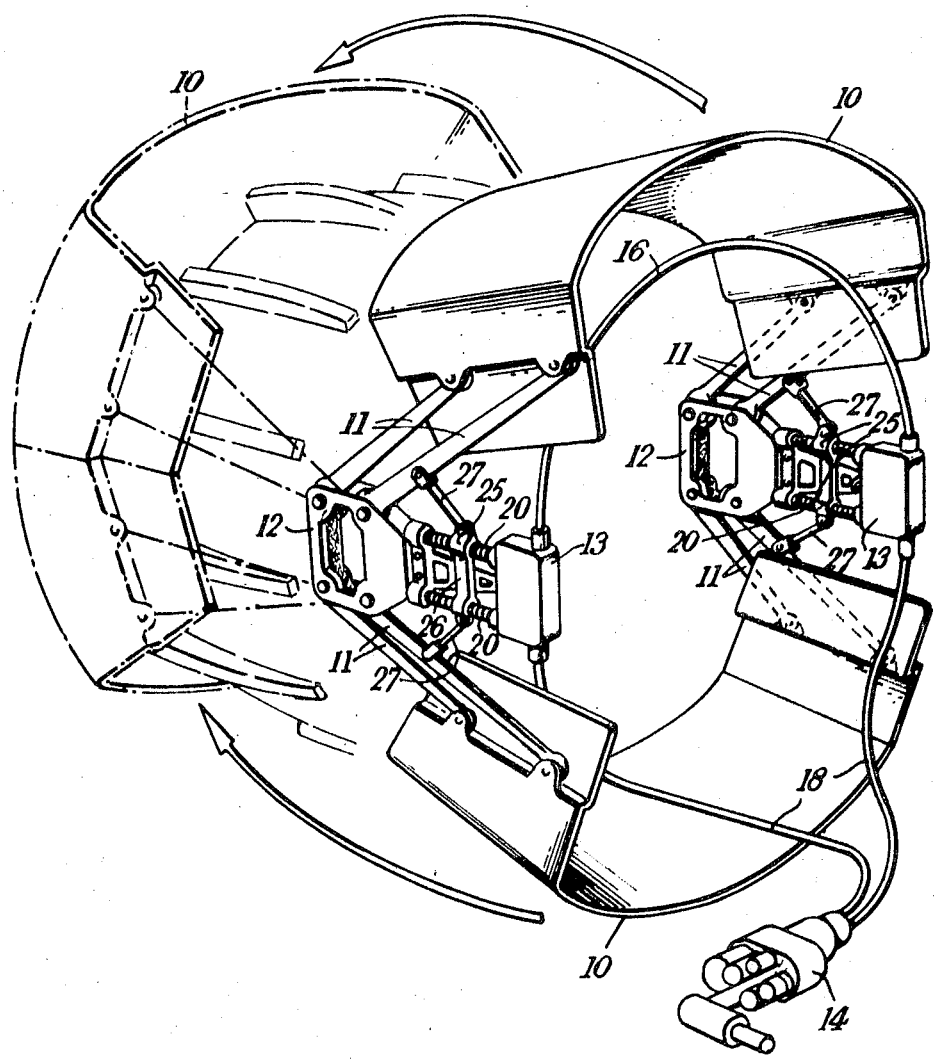
Figure 2:
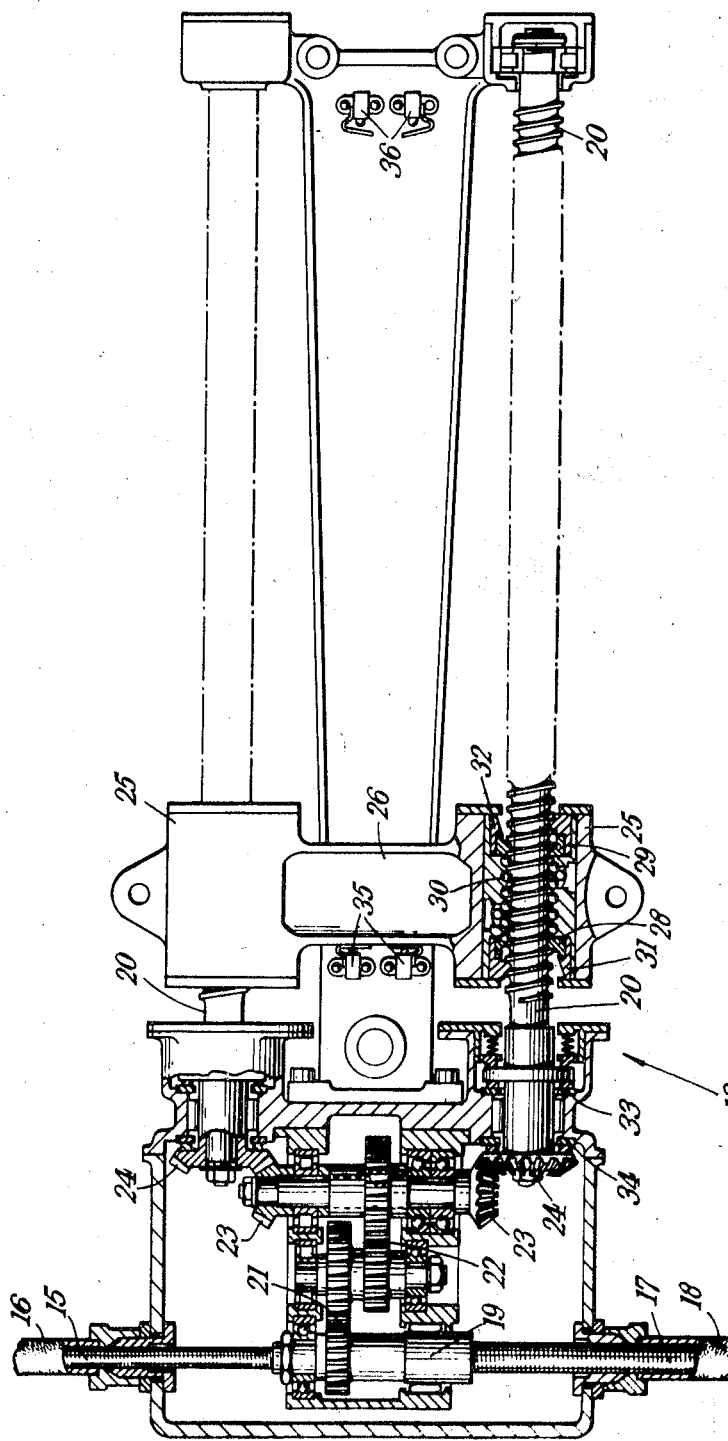
Figure 3:
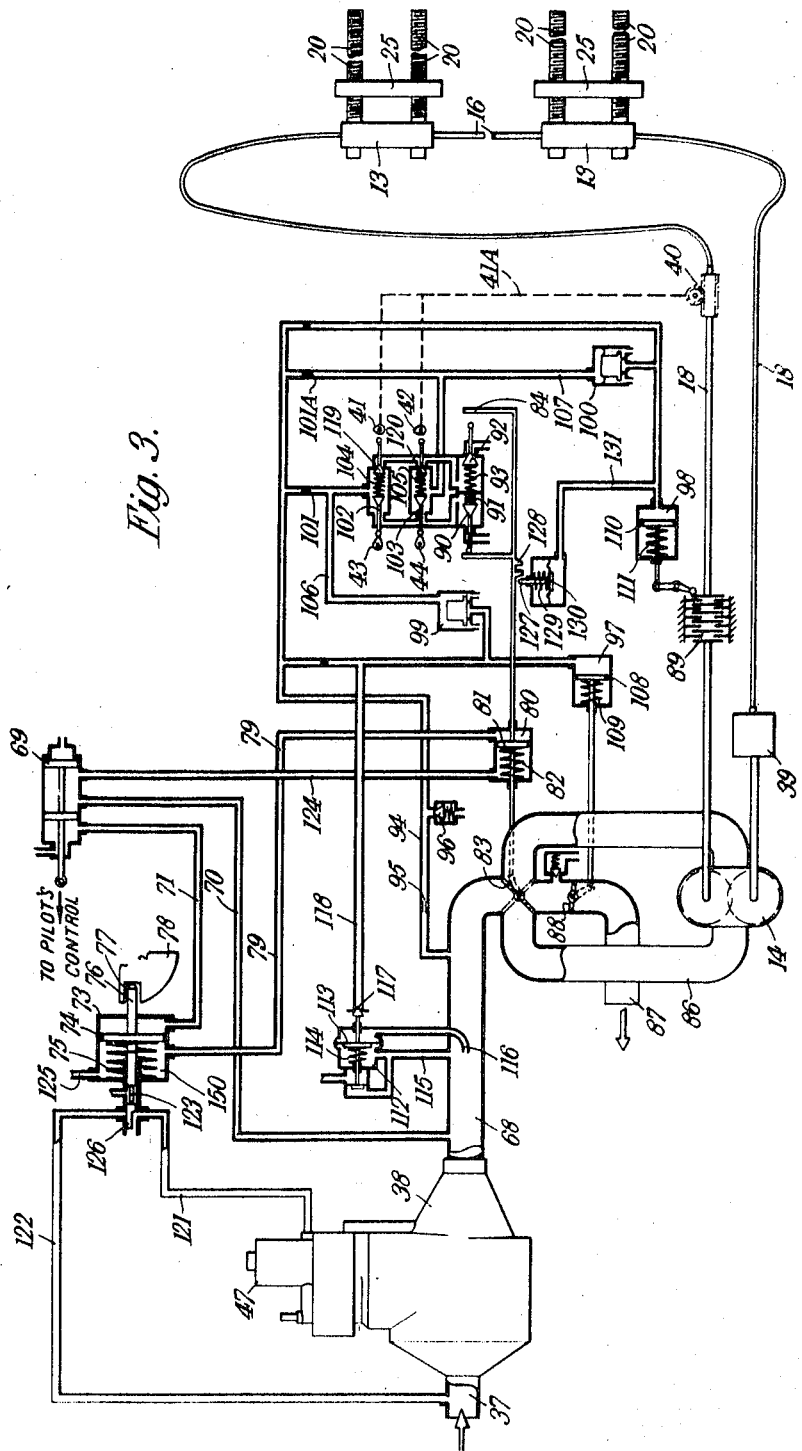
Figure 4:
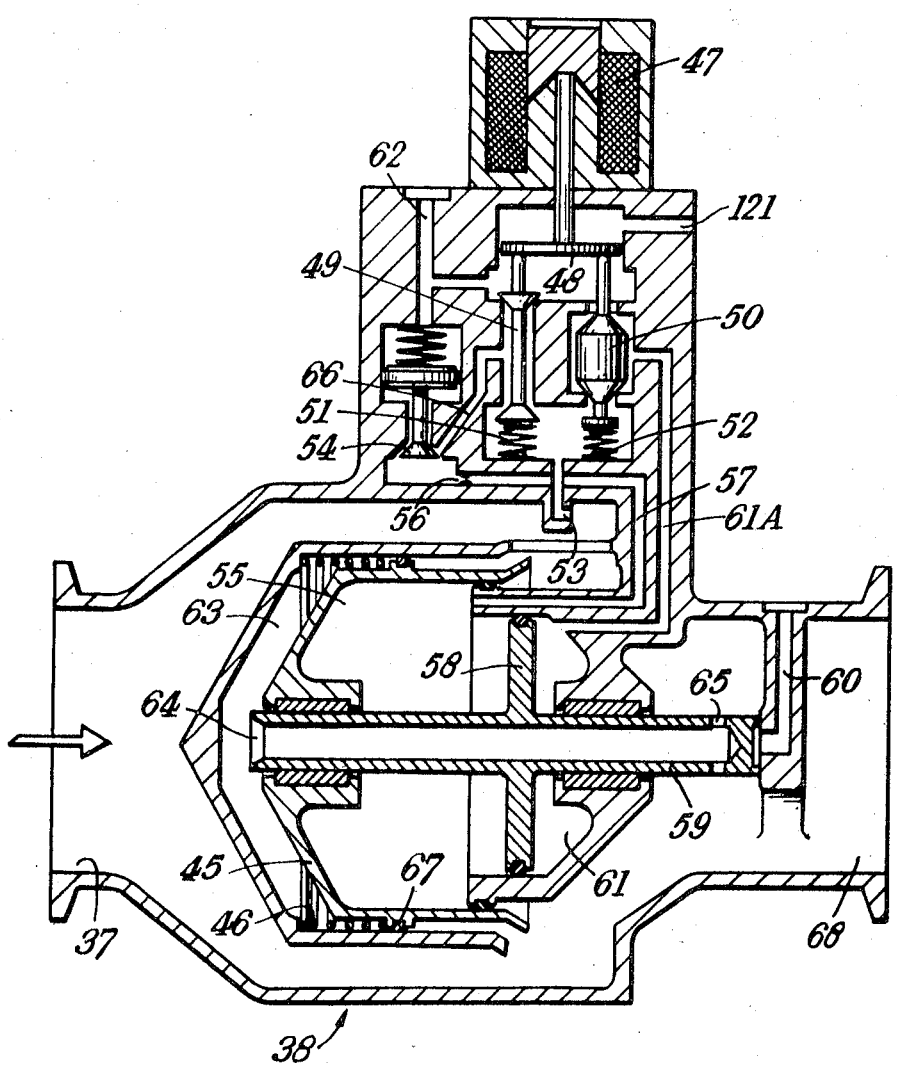

Certain embodiments of thrust reversal system according to the invention will now be described in more detail, by way of example, with reference to the accompanying drawings, in which FIG. 1 is a perspective view showing the thrust reverser buckets and their operating linkages, FIG. 2 is a sectional view illustrating the operation of one of the thrust reverse actuators, FIG. 3 is a diagram illustrating one form of control unit for the buckets, FIG. 4 is a sectional view showing details of the combined shut-off and pressure regulating valve shown in FIG. 3, and FIGS. 6 – 8 are diagrams showing alternative forms of control unit. Like reference numerals indicate like parts throughout the Figures.

As shown in FIG. 1, the system includes a pair of thrust reverser buckets 10, mounted on links 11 pivoted to fixed brackets 12 mounted in the tail pipe of a jet engine (not shown). The buckets 10 are movable by actuators 13 operated by an air motor 14 from a stowed position shown in full lines to a deployed position shown in chain-dotted lines in which they are tightly closed together. The actuators 13 are interconnected by flexible shafts 15 (FIG.2) encased in tubes 16 and they are driven from the motor 14 by flexible shafts 17 enclosed in tubes 18.

As shown in FIG. 2, each actuator 13 includes a drive shaft 19, fixed at its opposite ends to the flexible shafts 17, 15 and driving a pair of screw shafts 20 through spur reducing gears 21, 22 and bevel gearing 23, 24.

The rotation of each shaft 20 causes a recirculating ballnut 25 to move along the screw on the shaft, the torque reaction of each nut being taken by the other nut through a connecting beam 26. As shown in FIG. 1, the ballnuts 25 are connected to the links 11 by links 27. Carbon wipers 28 and 29 inserted in each nut 25 are used to keep dirt off the recirculating balls 30 and ice chippers 31 and 32 are provided at each end of the nut. Thrust races 33 and 34 transmit the end loads from the ballnuts back to the gearbox structure. Micro-switches 35 and 36 operate at each end of the travel to indicate the position of the buckets to the pilot.

The motor 14, which is supplied with operating air under pressure from the compressor of the engine through an inlet 37 (FIG. 3) under control of a combined shut-off and pressure regulator valve 38, is provided with a torque failure indicator 39 and, in addition to driving the actuators 13, drives through worm and worm wheel gearing 40, a cam shaft 41A shown diagrammatically in FIG. 3 and driving cams 41, 42 43 and 44 which operate as explained later.

As shown in FIG. 4, the valve 38, which contains a valve plunger 45 urged to the right to a closed position by a spring 46, is controlled by a solenoid 47. The solenoid is energized only upon closure of two micro-switches, not shown, in series. One of these switches is closed by movement of a pilot's lever to a deploy position to select reverse thrust and the other switch is closed when the undercarriage of the aircraft senses ground contact. When the solenoid is de-energized the valve 38 is closed but it opens upon energization of the solenoid as will now be described.

Energization of the solenoid 47 depresses a piston 48 to shift poppet valves 49, 50 loaded by springs 51, 52 from shut-off positions to the positions shown in FIG. 4. A backward facing pressure sensor 53 then transmits inlet pressure via the valve 49 to a pilot regulator valve 54. The pressure downstream of the valve 54 is fed to a chamber 55 via a damping restrictor 56 and a passage 57. A piston 58 on a spindle 59 is accordingly moved to the right to the position shown causing the spindle 59 to seal the vent connection 60, and the chamber 61 to the right of the piston 58 being ported to atmosphere via a passage 61A, the poppet valve 49 and a vent 62. Downstream pressure is fed into a chamber 63 through the open end 64 of a cavity in the spindle 59 from a sensing point 65.

The force balance on the main valve 45 is made up of two pressure components and a small spring closing force exerted by the spring 46. Downstream pressure, applied to the chamber 63, produces a valve closing force. This is opposed by the reference pressure in the chamber 55 maintained by the pilot regulator valve 54.

As the solenoid 47 is de-energized in this condition the spring-loaded poppet valves 49, 50 move across to the 'shut-off' position. The chamber 61 is then exposed to inlet pressure from the sensor 53 via the poppet valve 50 and the passage 61A. This causes the piston 58 and the spindle 59 to move to the left to close the open end 64 of the spindle, at the same time opening the vent connection 60 to exhaust the system downstream of the regulating valve. Simultaneously pressure to the pilot regulator valve 51 is cut off by the poppet valve 49 and the chamber 55 exhausts to atmosphere via the passages 57 and 66 and poppet valve 49, inlet pressure leaks into the chamber 63 past carbon piston rings 67 and assists the spring 46 to close the main valve 45. The spring 46 ensures that the valve is closed when the supply pressure is zero.

Movement of the pilot's lever to the deploy position not only opens the valve 38 to pass air at a pressure regulated by the valve along a passage 68 but also shifts a selector valve 69 to the left from the position shown in FIG. 3, to allow air under pressure to flow from the passage 68 through passages 70, 71 to a chamber 72 of a reverser bucket lock 73. This causes a piston 74 to move to the left against a spring 75 to withdraw a locking peg 76 from a recess 77 in a cam 78 attached to one of the buckets 10. Movement to the left of the piston 74 also allows pressure air to flow through a passage 79 to a chamber 80, so moving a piston 81 to the left against a spring 82. The piston 81 is connected to a directional control valve 83 and to a valve actuator 84. The movement of the piston shifts the valve 83 from the position shown in full lines to that shown in chain-dotted lines so admitting pressure air to a passage 83 leading to the air motor 14. The motor cannot, however, start immediately because the passage 86 connecting the motor to an exhaust outlet 87 is initially closed by a snubber valve 88 and a disc brake 89 is initially applied to one of the motor shafts.

In the position of the actuator 84 shown in FIG. 3 it holds an interlock valve 90 open against the action of its spring 91 and allows a companion interlock valve 92 to close under the action of its spring 93. Air admitted through a line 94, containing a restrictor 95 and provided with a relief valve 96, to a chamber 97 and to a chamber 98 is vented to exhaust by dump valves 99, 100. Movement of the actuator 84 to the left allows the valve 90 to close and opens the valve 92. Closure of the valve 90 closes air bleed paths to exhaust through restrictors 101, 101A and vent valves 102, 103 which are at this time held open by the cams 43, 44 against the action of springs 104, 105. The pressure in passages 106, 107 leading to the dump valves 99, 100 accordingly rises, causing the dump valves to close and the pressure in the chambers 97, 98 to rise. Accordingly a piston 108 is moved to the left against the action of a spring 109 to open the snubber valve 88 and a piston 110 is moved to the left against the action of a spring 111 to take off the brake 89.

The air motor 14 hen drives the buckets to the deploy position, the speed of operation being limited by a speed control valve 112. The valve 112 includes a diaphragm 113, loaded by a spring 114 and subject at its opposite sides to static and dynamic pressure applied to it by pressure pickoffs 115, 116 in the inlet passage 68. If the dynamic pressure exceeds a limiting value the diaphragm 113 opens a valve 117 to bleed air from a line 118, reduce the pressure in the chamber 97 and cause the snubber valve 88 to reduce the speed of the motor 14 by partial snubbing of the exhaust outlet 87.

As the buckets approach the deploy position the cam 41 opens a vent valve 119 to permit an air bleed to exhaust via the open interlock valve 92. Pressure in the passage 106 falls due to the bleed across the restrictor 101 and the dump valve 99 accordingly opens to spill air from the chamber 97 causing the snubber valve 88 to close the exhaust outlet 87. A reverse torque is produced at the motor shaft due to the build-up of air pressure in the blocked exhaust passage and rapid deceleration of the motor occurs.

At a later stage in the deceleration the cam 42 opens a vent valve 120 to permit an air bleed to exhaust via the interlock valve 92 from the passage 107 and the dump valve 100 opens to spill air from the chamber 98, causing the brake 89 to be applied. Limit stops are fitted at either end of the travel of the reverser buckets and the timing of the cams is such that the output speed is low as the buckets reach the stops.

A similar sequence of operations occurs when the pilot's lever is removed to select return of the buckets to the stowed position. This movement de-energizes the solenoid 47 in the regulating valve 38 but this valve is maintained open by admission of air under pressure through an inlet 121 (FIG.4) to the upper surface of the piston 48, this air being derived from a passage 122 (FIG.3) which is maintained open by an annulus 123 on the bucket lock plunger 76 until this plunger is able to re-engage the recess 77.

The pilot's lever also moves the selector valve 69 to stow position shown, in which the chamber 72 of the bucket lock is connected to exhaust and air under pressure is applied through a line 124 to the left hand side of the piston 81. The bucket lock piston 74 then moves towards the stow position, under the influence of its return spring 75, until movement is arrested by abutment of the locking peg 76 abutting against a cam face 78. This movement is sufficient to connect the chamber 80 to an exhaust outlet 125 via the passage 79 and chamber 150. The piston 81 therefore moves the directional control valve 83 to the stow position shown in full lines, admitting air at regulated pressure to the air motor 14 via the passage 86, and connecting the passage 85 to the snubber valve 88. As the valve 83 moves to the stow position, the actuator 8' allows the interlock valve 92 to close thus blocking the air bleed paths to exhaust across the vent valves 119 and 120 and the restrictors 101 and 101A. The pressure in the passages 106 and 107 rises causing the dump valves 99 and 100 to close. The disc brake 89 is therefore disengaged and the snubber valve 88 is fully opened.

The air motor 14 then drives the buckets towards the stow position. As this position is approached the snubber valve closing sequence is initiated by the cam 43 opening the vent valve 102 and subsequently the disc brake operating sequence is initiated by the cam 44 opening the vent valve 103. As the buckets reach the limit stops the locking peg 76 engages the recess 77 ensuring that the buckets remain securely locked in the stowed position. At the same time a valve land 126 on the bucket lock shuts off the supply pressure in the passage 122, causing the regulating valve 38 to close.

The directional control valve 83 is locked in its alternative positions by engagement of a plunger 127 with alternative recesses in the valve actuating linkage, one of which is indicated at 128. The plunger 127 is normally retracted by a spring 129 but is moved to the locking position by pressure applied to a diaphragm 130 through a passage 131 when the brake 89 is disengaged.

In the system just described a cam causes the snubber valve 88 to close as the buckets approach the deployed or stowed position to decelerate the motor and at a later stage another cam applies the brake 89. Certain modified control systems will now be described which provide position feedback to the directional control valve, the snubber valve being sometimes omitted, or to the snubber valve, and in which the brake is in some cases dispensed with.

Figure 5:
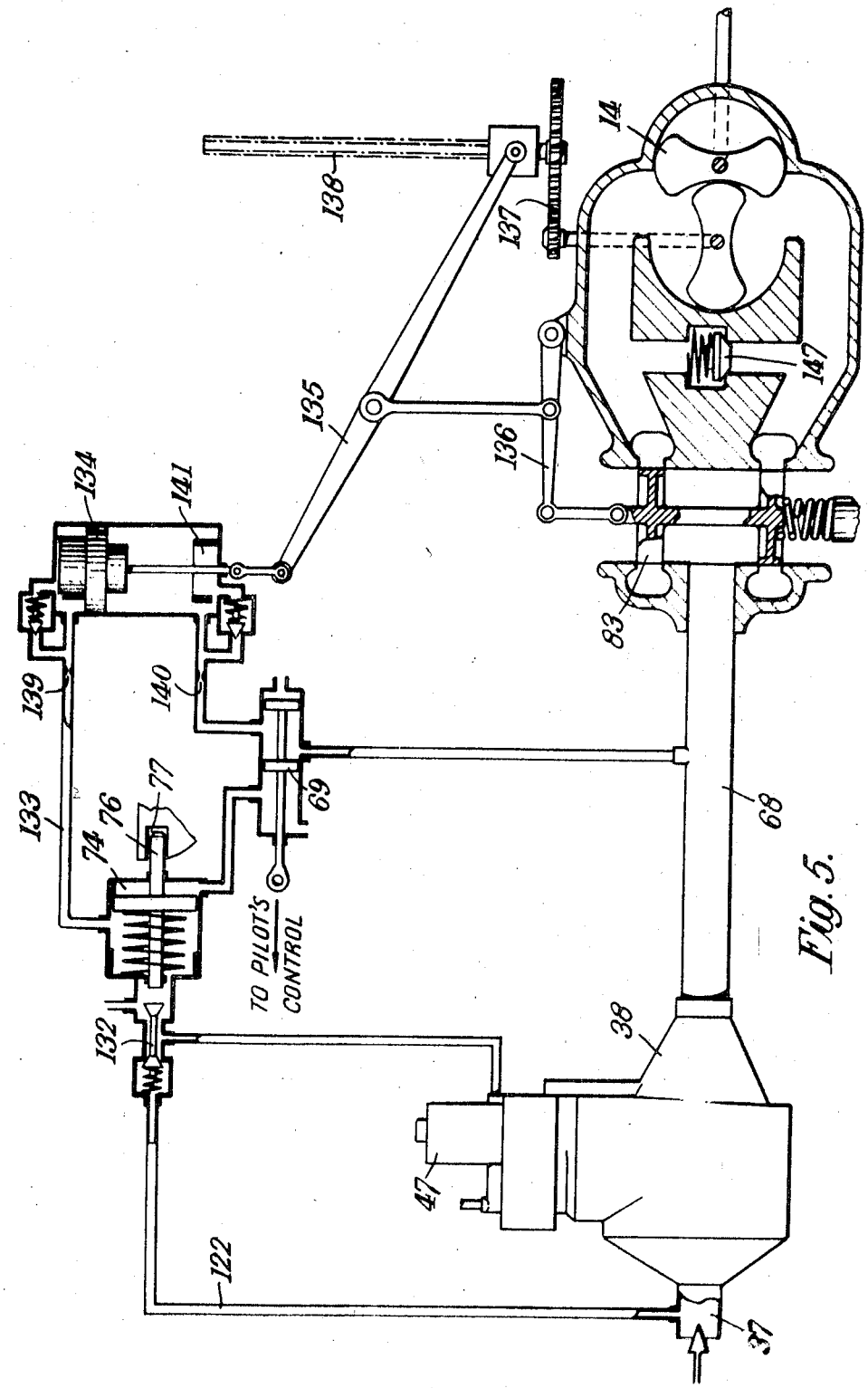

In the system shown in FIG. 5 the solenoid 47 of the pressure regulating valve 38 is energized as before when the pilot's lever is moved to deploy provided ground contact has been made, so causing the valve 38 to open. Movement of the pilot's lever to deploy moves the selector valve 69 to the left to supply pressurized air to the right hand side of the bucket lock piston 74. When this pressure has moved the piston 74 to the left to retract the plunger 76 and open a valve 132 in the line 122, the pressurized air passes through a passage 133 to an actuator piston 134 for actuating the directional control valve 83.

The actuator piston 134 is accordingly moved down to cause a differential lever 135 to shift a link 136 and move the valve 83 downwardly to supply air to the air motor 14, which accordingly rotates to move the buckets to the deployed position. Rotation of the motor causes the differential lever 135 to provide feedback to the valve 83 in the direction to close it, the feedback drive being taken via a reduction gear 137 and a recirculating ball screw 138. The velocity of the piston 134 is controlled by restrictors 139 and 140.

As the deployed position is approached, the piston 134 contacts a dashpot 141 and gradually slows down so that it contacts its end stop with minimal velocity. As the piston 134 decelerates, the motor 14 will tend to run on until it in turn is decelerated when the output is sufficiently out of phase with the input to have reversed the porting of the valve 83 so that the motor acts as a brake. The travel of the piston 134 is such that the valve 83 is sufficiently open when the buckets are closed to ensure that the closing torque is always present.

The stowing action is the reverse of the above. The shut-off valve 38 is held open after the solenoid 47 has been de-energized by pressure through the connection 122 and the valve 132. It is thus kept open until the buckets have reached the position in which the lock 76 re-engages. A relief valve 147 protects the buckets from excessive loads by limiting the pressure drop across the motor 14.

Figure 6:
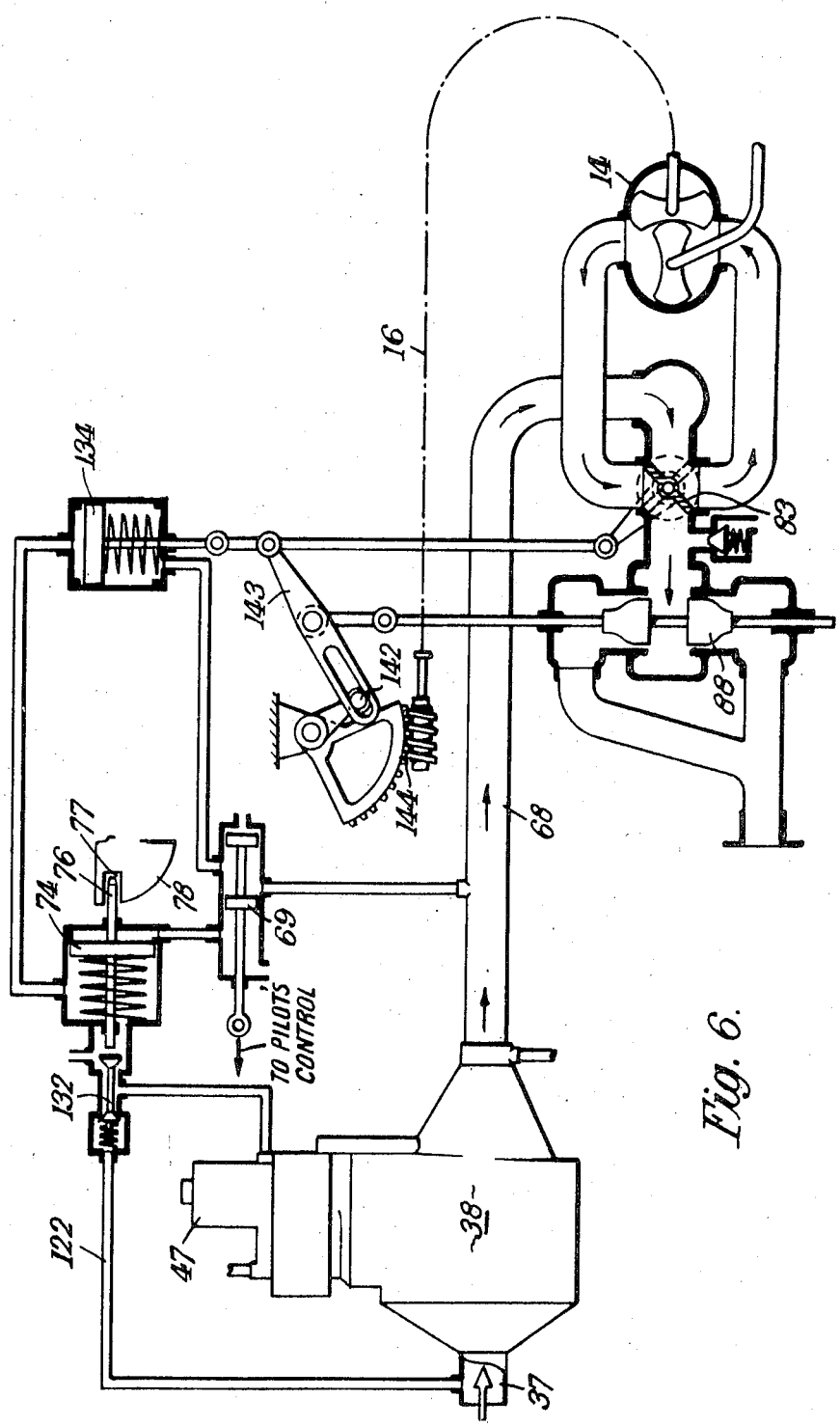

FIG. 6 shows a similar system but with a different feedback arrangement in which the position of the fulcrum 142 of a lever 143 interconnecting the piston 134 and the directional control valve 83 is progressively adjusted by gearing 144 driven by the motor 14. The system includes the snubber valve 88 connected to the lever 143 and therefore caused to assume a position depending on the extent of travel of the buckets.

Figure 7:
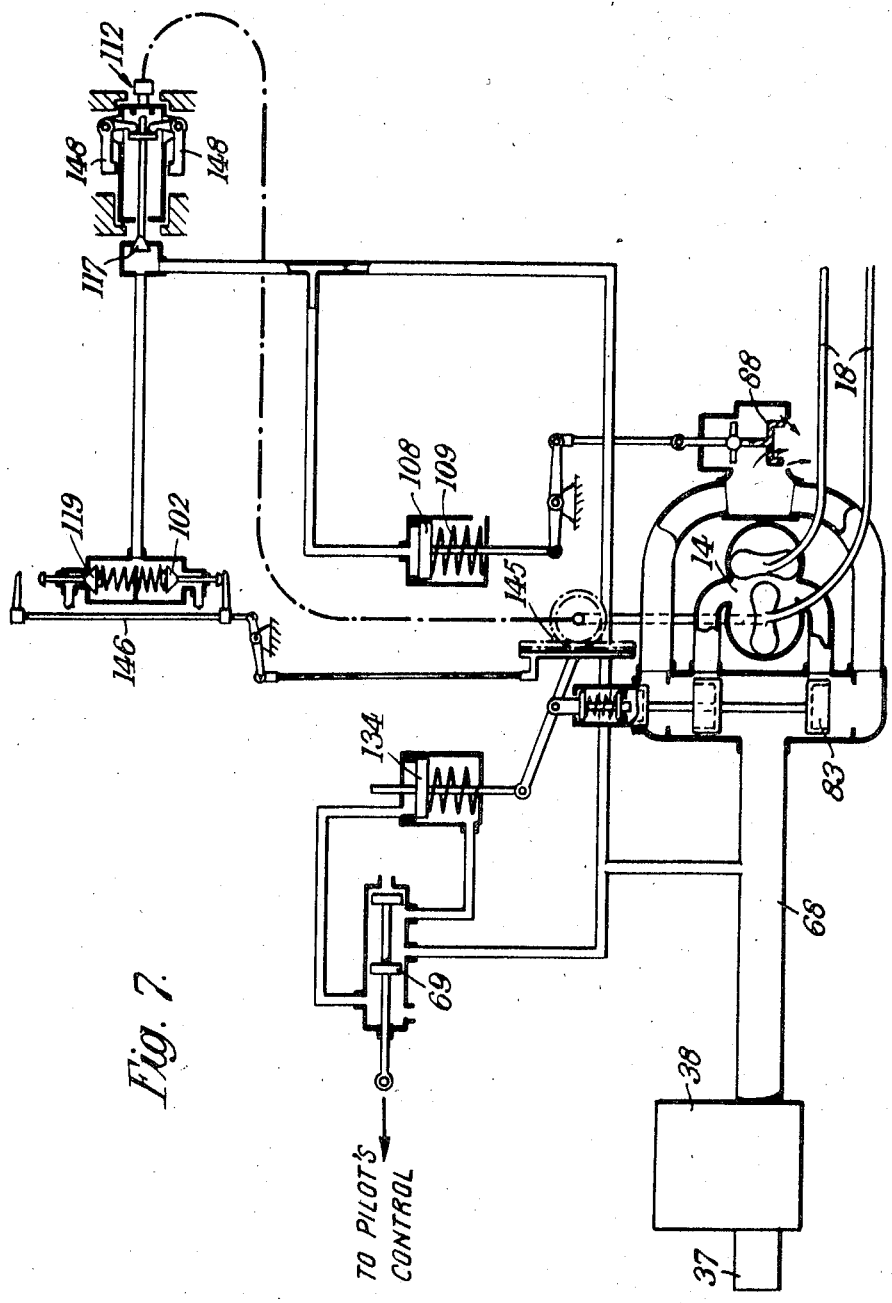

FIG. 7 shows a further system in which position feedback similar to that of FIG. 5 is applied both to the actuator piston 134 of the directional control valve 83 and to snubber vent valves 102, 119 which operate towards the end of the movement of the buckets to vent the pressure acting on the upper end of the piston 108 of a snubber valve actuator and cause it to be moved by the spring 109 to close a snubber valve 88. As the piston 134 moves to operate the directional control valve 83 it shifts an actuator 146 to allow the vent valve 102 to close, so causing the piston 108 to open the snubber valve 88. The other vent valve 119 is opened through the agency of the feedback mechanism 145 and the actuator 146 as the deploy position is neared to cause the snubber valve 88 to close again. A maximum speed control valve 112 controlled by flyweights 148 driven by the motor 14, opens a valve 117 when necessary to bleed air from the piston 108 and causes partial closure of the snubber valve.

Figure 8:
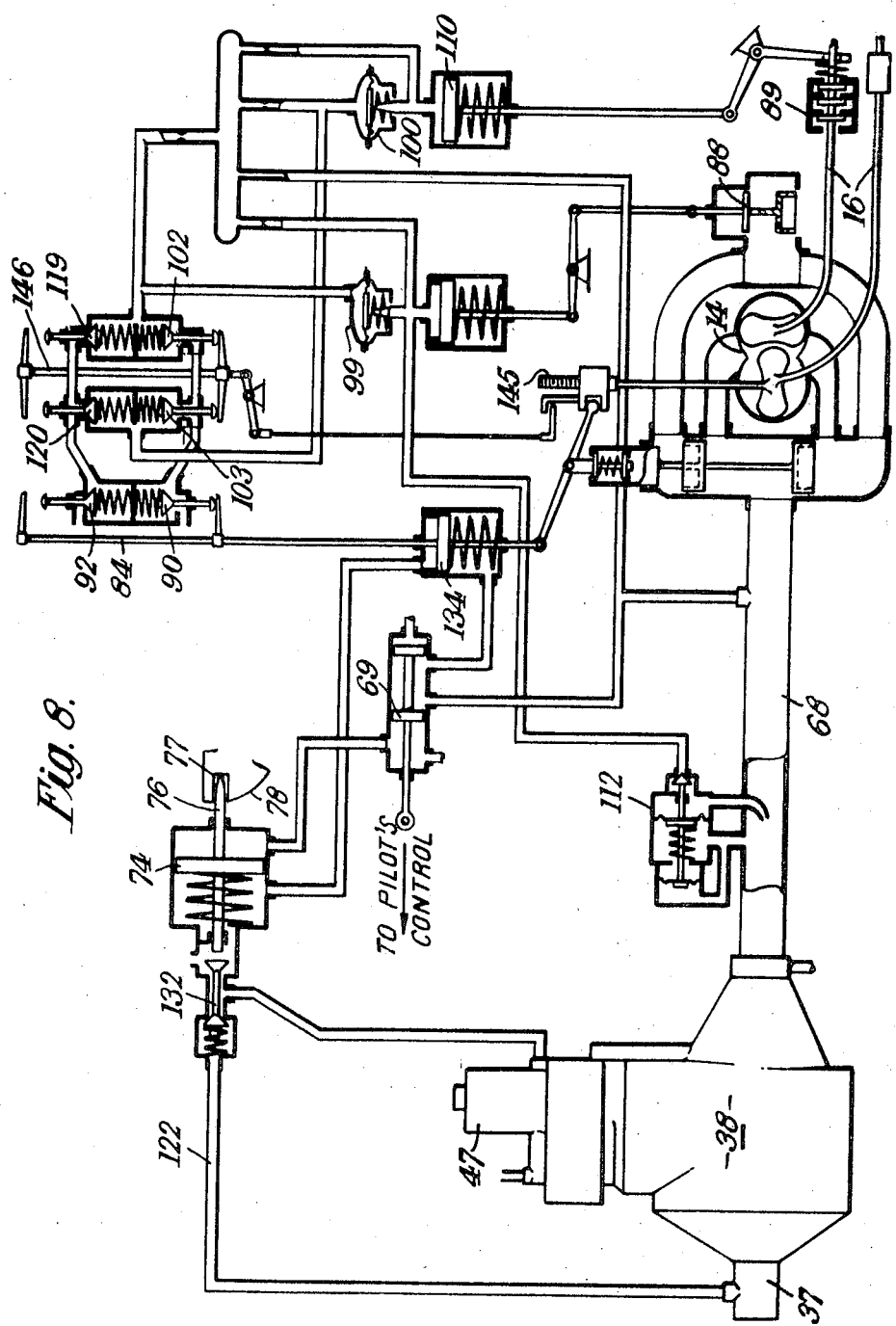

FIG. 8 shows a variant of the system of FIG. 7 providing feedback controlling a disc brake 89, having an actuator piston 110, brake vent valves 103, 120 interlock valves 90, 92 and a speed control valve 112 which operate as described with reference to FIG. 3. The vent valves instead of being operated by cams are operated by an actuator 146 linked to the piston 134 through the agency of the feedback mechanism 145.

What we claim as our invention and desire to secure by Letters Patent is:

1. A thrust reversal system for an aircraft jet engine comprising a pair of thrust reverser buckets movable between a stowed and a deployed position, an air motor operable under pilot's control for imparting movement to the buckets and mechanism for automatically decelerating the air motor as the buckets approach both the stowed and the deployed positions.

2. A system as claimed in claim 1, in which the air motor includes a snubber valve and which comprises mechanism operated by the motor for imparting closing movement to the snubber valve when the buckets near the end of their travel.

3. A system as claimed in claim 2, which includes a pneumatic servo motor for operating the snubber valve and vent valves controlled by cams operated by the air motor for venting air from the servo motor near the end of the travel of the buckets.

4. A system as claimed in claim 2, in which the closing movement is imparted to the snubber valve by feedback from the air motor.

5. A system as claimed in claim 1, which comprises a brake for the air motor and a pneumatic servo motor arranged to apply the brake when the buckets near the end of their travel.

6. A system as claimed in claim 5, which includes vent valves operated by the air motor for venting air from the servo motor for the purpose of applying the brake.

7. A system as claimed in claim 5, which includes a feedback connection from the air motor which is operative on the servo motor to effect application of the brake.

8. A system as claimed in claim 1, which includes a directional control valve for the air motor, a pneumatic servo motor for actuating said valve and a selector valve operative under pilot's control to cause said servo motor to move the directional control valve in the direction corresponding to the intended direction of travel of the buckets.

9. A system as claimed in claim 8, which includes a feedback connection between the air motor and the directional control valve.

10. A system as claimed in claim 1, which includes two ball servo actuators operated by the air motor for imparting movement to the buckets.

11. A system as claimed in claim 1, which includes a pneumatically operated locking plunger for locking the buckets in the stowed position and a selector valve operable by the pilot to retract the plunger upon selection of movement of the buckets to the deployed position and to urge the plunger towards its locking position on selection of movement of the buckets to the stowed position.

12. A system as claimed in claim 11, which includes a combined shut-off and pressure regulating valve arranged to open under solenoid control upon selection by the pilot of movement of the buckets to the deployed position and to be retained open pneumatically under control of a pneumatic servo motor controlling the locking plunger until the locking plunger has returned to locking position upon return of the buckets to the stowed position.

* * * * *